(12) United States Patent
Okahara et al.

(10) Patent No.: US 10,989,301 B2
(45) Date of Patent: Apr. 27, 2021

(54) CONTROL DEVICE FOR CONTINUOUSLY VARIABLE TRANSMISSION AND CONTROL METHOD FOR CONTINUOUSLY VARIABLE TRANSMISSION

(71) Applicant: JATCO Ltd, Fuji (JP)

(72) Inventors: Ken Okahara, Fuji (JP); Kazutaka Adachi, Kanagawa (JP); Yutaka Kaneko, Kanagawa (JP); Kenichi Mori, Kanagawa (JP)

(73) Assignee: JATCO LTD, Fuji (JP)

( * ) Notice: Subject to any disclaimer, the term of this patent is extended or adjusted under 35 U.S.C. 154(b) by 69 days.

(21) Appl. No.: 16/085,363

(22) PCT Filed: Feb. 23, 2017

(86) PCT No.: PCT/JP2017/006818
§ 371 (c)(1),
(2) Date: Sep. 14, 2018

(87) PCT Pub. No.: WO2017/159270
PCT Pub. Date: Sep. 21, 2017

(65) Prior Publication Data
US 2019/0093764 A1    Mar. 28, 2019

(30) Foreign Application Priority Data
Mar. 17, 2016    (JP) .............................. JP2016-053389

(51) Int. Cl.
*F16H 59/70* (2006.01)
*F16H 61/66* (2006.01)
*F16H 61/662* (2006.01)
*F16H 61/02* (2006.01)
*F16H 61/00* (2006.01)
(Continued)

(52) U.S. Cl.
CPC .......... *F16H 61/662* (2013.01); *F16H 61/00* (2013.01); *F16H 61/0202* (2013.01); *F16H 59/18* (2013.01); *F16H 59/44* (2013.01); *F16H 59/70* (2013.01); *F16H 61/702* (2013.01); *F16H 2059/704* (2013.01); *F16H 2061/0078* (2013.01)

(58) Field of Classification Search
CPC .......................... F16H 2059/704; F16H 61/66
See application file for complete search history.

(56) References Cited

U.S. PATENT DOCUMENTS 5,936,158 A * 8/1999 Ashizawa ............... G01P 15/16
73/488
5,993,338 A 11/1999 Kato et al.
(Continued)

FOREIGN PATENT DOCUMENTS

JP    11-194801 A    7/1999
JP    2002-106700 A    4/2002
JP    2016148379 A *  8/2016 ............. F16H 61/02

*Primary Examiner* — Tisha D Lewis
(74) *Attorney, Agent, or Firm* — Foley & Lardner LLP

(57) ABSTRACT

A controller constitutes a control device for continuously variable transmission for executing a feedback control of a transmission so that an actual speed ratio reaches a target speed ratio. The controller includes a first phase lead compensator and a second phase lead compensator configured to perform phase lead compensation of a feedback primary command pressure, and a peak value frequency determination unit configured to change a peak value frequency according to a speed ratio.

7 Claims, 6 Drawing Sheets

(51) Int. Cl.
*F16H 61/70* (2006.01)
*F16H 59/18* (2006.01)
*F16H 59/44* (2006.01)

(56) References Cited

U.S. PATENT DOCUMENTS

| | | | |
|---|---|---|---|
| 2012/0083953 A1* | 4/2012 | Izawa | B60L 50/16 |
| | | | 701/22 |
| 2016/0056739 A1* | 2/2016 | Hashimoto | B60L 3/0061 |
| | | | 318/400.09 |
| 2017/0217332 A1* | 8/2017 | Hashimoto | B60L 15/20 |
| 2019/0226580 A1* | 7/2019 | Hong | F16H 61/66259 |

* cited by examiner

CONTROL DEVICE FOR CONTINUOUSLY VARIABLE TRANSMISSION AND CONTROL METHOD FOR CONTINUOUSLY VARIABLE TRANSMISSION

TECHNICAL FIELD

The present invention relates to a control device for continuously variable transmission and a control method for continuously variable transmission.

BACKGROUND ART

Concerning a shift control of a continuously variable transmission, a technique for advancing a target speed ratio for compensation by a response delay of an actual speed ratio with respect to the target speed ratio is disclosed in JP2002-106700A.

SUMMARY OF INVENTION

In a continuously variable transmission, front-rear vibration may occur which induces shaking in a front-rear direction at a resonant frequency of a power train. The front-rear vibration is thought to occur with a torque variation of the power train and a shift of the continuously variable transmission coupled when the stability of a speed ratio of the continuously variable transmission with respect to the torque variation lacks. Thus, it is considered to suppress the front-rear vibration by enhancing the stability of the speed ratio of the continuously variable transmission, i.e. enhancing damping properties by performing lead compensation.

However, in the lead compensation, a peak value frequency indicating a peak of an advance amount corresponding to a frequency is present, and the advance amount decreases and a damping effect is reduced as the frequency deviates more from the peak value frequency. Thus, depending on a running state of a vehicle, a frequency deviation between the resonant frequency and the peak value frequency becomes larger according to a change of the resonant frequency of the power train, with the result that the damping effect may be reduced.

The present invention was developed in view of such a problem and aims to provide a control device for continuously variable transmission and a control method for continuously variable transmission capable of improving a reduction of a damping effect caused by lead compensation according to a change of a resonant frequency of a power train.

A control device for continuously variable transmission according to a certain aspect of the present invention is a control device for continuously variable transmission for executing a feedback control on the basis of an actual value representing a state of a continuously variable transmission. The control device includes a lead compensation unit configured to perform lead compensation of the feedback control, and a peak value frequency determination unit configured to change a peak value frequency of the lead compensation according to a speed ratio of the continuously variable transmission.

According to another aspect of the present invention, a control method for continuously variable transmission for executing a feedback control on the basis of an actual value representing a state of a continuously variable transmission is provided. The control method includes performing lead compensation of the feedback control, and changing a peak value frequency of the lead compensation according to a speed ratio of the continuously variable transmission.

According to these aspects, even if a speed ratio changes to change a resonant frequency of a power train, a frequency deviation between the resonant frequency and a peak value frequency of a lead compensation frequency can be suppressed by changing the peak value frequency according to the speed ratio. Thus, it can be improved that the damping effect by the lead compensation is reduced according to a change of the resonant frequency of the power train.

DESCRIPTION OF EMBODIMENT

Hereinafter, an embodiment of the present invention is described with reference to the accompanying drawings.

Figure 1:
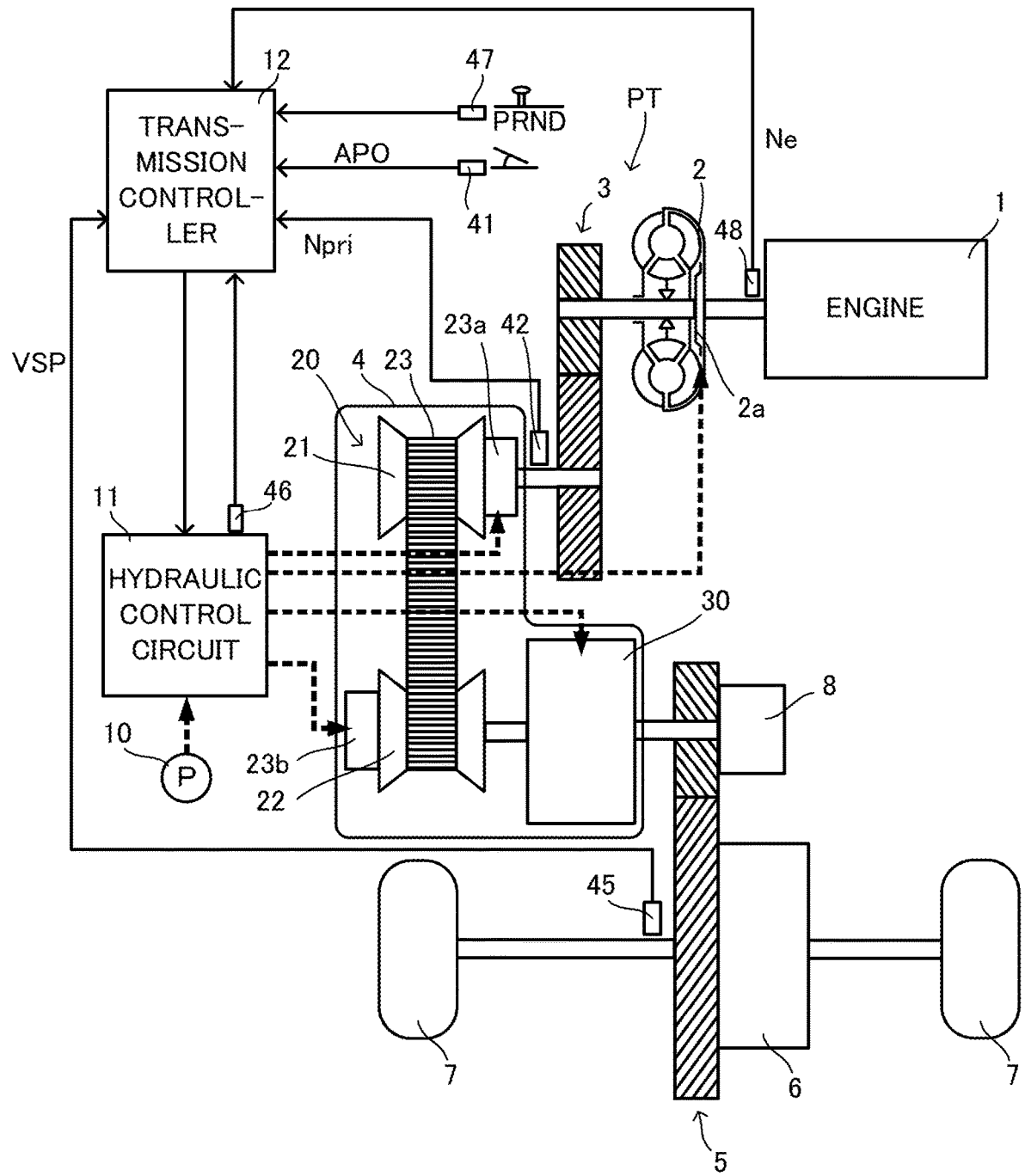
FIG. 1 is a schematic configuration diagram of a vehicle including a transmission controller.

FIG. 1 is a schematic configuration diagram of a vehicle including a transmission controller 12. The vehicle includes an engine 1 as a power source. Power of the engine 1 is transmitted to drive wheels 7 via a torque converter 2, a first gear train 3, a transmission 4, a second gear train 5 and a differential device 6 which constitute a power train PT. The second gear train 5 is provided with a parking mechanism 8 for mechanically unrotatably locking an output shaft of the transmission 4 in parking.

The torque converter 2 includes a lock-up clutch 2a. When the lock-up clutch 2a is engaged, there is no more slip in the torque converter 2 and transmission efficiency of the torque converter 2 is improved. The lock-up clutch 2a is referred to as a LU clutch 2a below.

The transmission 4 is a continuously variable transmission including a variator 20. The variator 20 is a continuously variable transmission mechanism including a pulley 21 serving as a primary pulley, a pulley 22 serving as a secondary pulley and a belt 23 mounted between the pulleys 21 and 22. The pulley 21 constitutes a driving side rotary element and the pulley 22 constitutes a driven side rotary element.

Each of the pulleys 21, 22 includes a fixed conical plate, a movable conical plate arranged with a sheave surface facing the fixed conical plate and forming a V groove between the fixed conical plate and the movable conical plate, and a hydraulic cylinder provided on a back surface of the movable conical plate for displacing the movable conical plate in an axial direction. The pulley 21 includes a hydraulic cylinder 23a as the hydraulic cylinder and the pulley 22 includes a hydraulic cylinder 23b as the hydraulic cylinder.

If a hydraulic pressure to be supplied to the hydraulic cylinder 23a, 23b is adjusted, a width of the V groove changes to change a contact radius of the belt 23 and each pulley 21, 22, whereby a speed ratio of the variator 20 continuously changes. The variator 20 may be a toroidal type continuously variable transmission mechanism.

The transmission 4 further includes a sub-transmission mechanism 30. The sub-transmission mechanism 30 is a transmission mechanism with two forward speeds and one reverse speed and has a first-speed and a second-speed having a smaller speed ratio than the first-speed as forward gear positions. The sub-transmission mechanism 30 is provided in series with the variator 20 in a power transmission path from the engine 1 to the drive wheels 7.

The sub-transmission mechanism 30 may be directly connected to an output shaft of the variator 20 as in this example or may be connected via another shift or power transmission mechanism such as a gear train. Alternatively, the sub-transmission mechanism 30 may be connected to an input shaft side of the variator 20.

The vehicle is further provided with an oil pump 10 to be driven utilizing part of the power of the engine 1, a hydraulic control circuit 11 for adjusting a hydraulic pressure generated by the supply of oil by the oil pump 10 and supplying the adjusted hydraulic pressure to each part of the transmission 4, and a transmission controller 12 for controlling the hydraulic control circuit 11.

The hydraulic control circuit 11 is composed of a plurality of flow passages and a plurality of hydraulic control valves. The hydraulic control circuit 11 switches a hydraulic pressure supply path by controlling the plurality of hydraulic control valves on the basis of a shift control signal from the transmission controller 12. Further, the hydraulic control circuit 11 adjusts a necessary hydraulic pressure from the hydraulic pressure generated by the supply of the oil by the oil pump 10 and supplies the adjusted hydraulic pressure to each part of the transmission 4. In this way, the speed of the variator 20 is changed, the gear position of the sub-transmission mechanism 30 is changed and the LU clutch 2a is engaged/disengaged.

Figure 2:
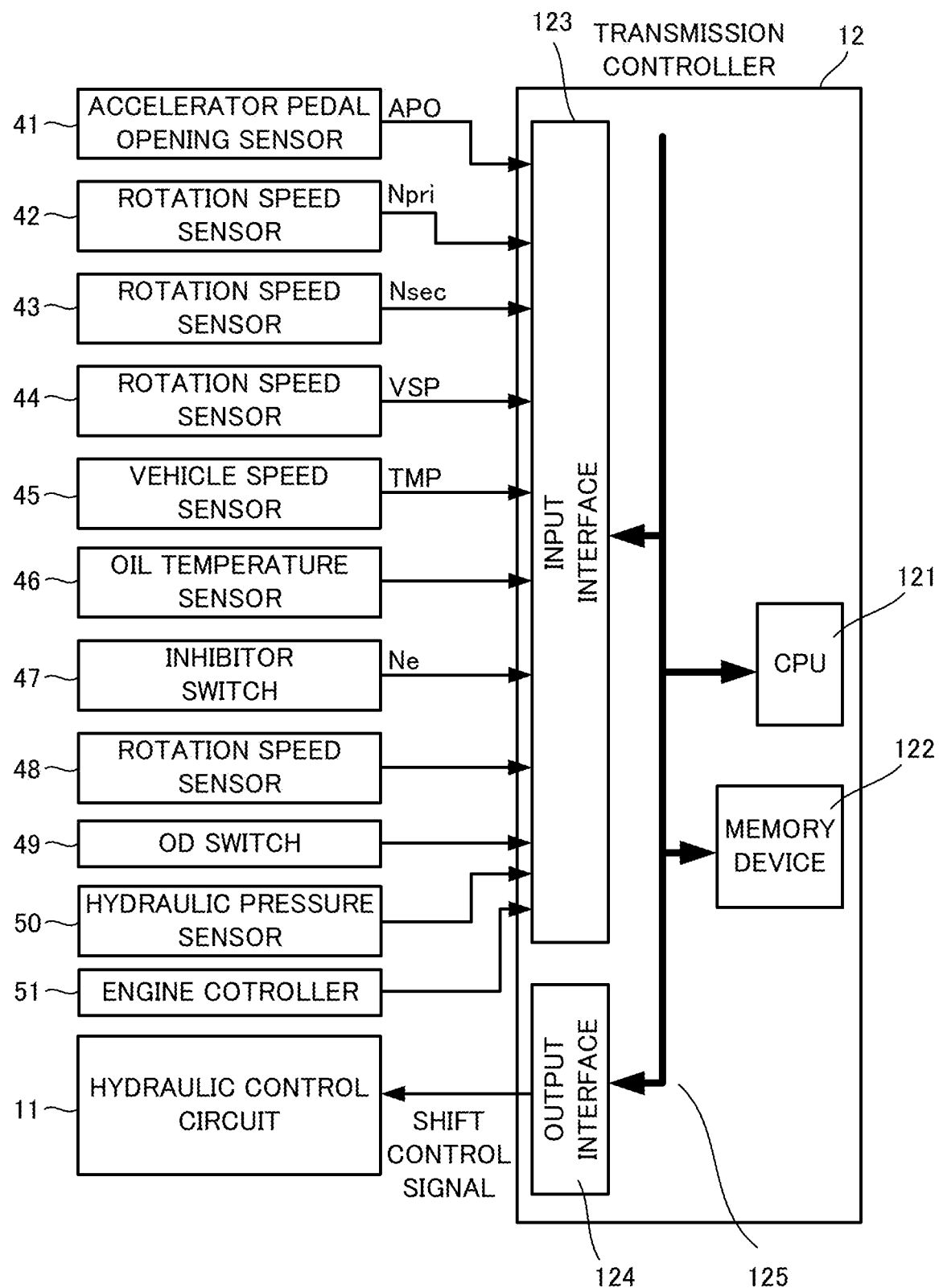
FIG. 2 is a schematic configuration diagram of the transmission controller.

FIG. 2 is a schematic configuration diagram of the transmission controller 12. The transmission controller 12 includes a CPU 121, a memory device 122 composed of a RAM and a ROM, an input interface 123, an output interface 124 and a bus 125 for connecting these components to each other.

To the input interface 123 are, for example, input an output signal of an accelerator pedal opening sensor 41 for detecting an accelerator pedal opening APO representing an operated amount of an accelerator pedal, an output signal of a rotation speed sensor 42 for detecting an input side rotation speed of the transmission 4, an output signal of a rotation speed sensor 43 for detecting a rotation speed Nsec of the pulley 22 and an output signal of a rotation speed sensor 44 for detecting an output side rotation speed of the transmission 4.

The input side rotation speed of the transmission 4 is, specifically, a rotation speed of an input shaft of the transmission 4, thus, a rotation speed Npri of the pulley 21. The output side rotation speed of the transmission 4 is, specifically, a rotation speed of the output shaft of the transmission 4, thus, a rotation speed of an output shaft of the sub-transmission mechanism 30. The input side rotation speed of the transmission 4 may be a rotation speed at a position opposite to the transmission 4 across the gear train or the like such as a turbine rotation speed of the torque converter 2. The same holds true for the output side rotation speed of the transmission 4.

To the input interface 123 are further input an output signal of a vehicle speed sensor 45 for detecting a vehicle speed VSP, an output signal of an oil temperature sensor 46 for detecting an oil temperature TMP of the transmission 4, an output signal of an inhibitor switch 47 for detecting the position of a select lever, an output signal of a rotation speed sensor 48 for detecting a rotation speed Ne of the engine 1, an output signal of an OD switch 49 for enlarging a shift range of the transmission 4 to a speed ratio smaller than 1, an output signal of a hydraulic pressure sensor 50 for detecting a hydraulic pressure to be supplied to the LU clutch 2a and the like. A torque signal of an engine torque Te is also input to the input interface 123 from an engine controller 51 provided in the engine 1.

A shift control program for the transmission 4, various maps used in the shift control program and the like are stored in the memory device 122. The CPU 121 reads and executes the shift control program stored in the memory device 122 and generates a shift control signal on the basis of various signals input via the input interface 123. Further, the CPU 121 outputs the generated shift control signal to the hydraulic control circuit 11 via the output interface 124. Various values used in computations by the CPU 121 and computation results of the CPU 121 are appropriately stored in the memory device 122.

In the transmission 4, front-rear vibration may occur at a PT resonant frequency Fpt, which is a resonant frequency of the power train PT. The front-rear vibration is thought to occur when a torque variation of the power train PT and a shift of the transmission 4 coupled when the stability of the speed ratio of the transmission 4 with respect to the torque variation lacks. Thus, it is considered to suppress the front-rear vibration by enhancing the stability of the speed ratio of the transmission 4, i.e. enhancing damping properties by performing lead compensation.

However, depending on a running state of the vehicle, a damping effect by the lead compensation may be reduced as described next.

Figure 3:
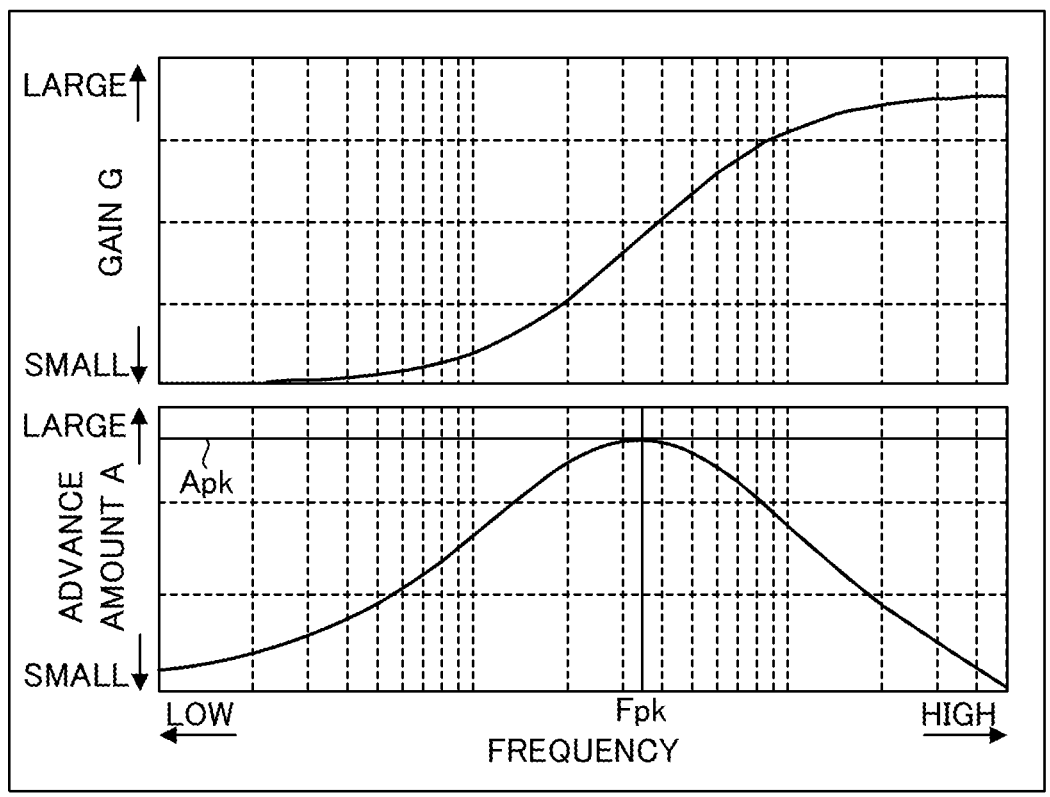
FIG. 3 is a graph showing an example of a Bode diagram of a phase lead compensator.

FIG. 3 is a graph showing an example of a Bode diagram of a phase lead compensator. A horizontal axis of the Bode diagram represents a frequency in logarithm. FIG. 3 shows a case where second-order phase lead compensation is performed. A peak value frequency Fpk is a frequency indicating a peak of an advance amount A corresponding to the frequency, and set according to a frequency targeted in the phase lead compensation. The targeted frequency is specifically the PT resonant frequency Fpt. Thus, the peak value frequency Fpk is, for example, set at the PT resonant frequency Fpt. An advance amount Apk indicates an advance amount A corresponding to the peak value frequency Fpk.

As shown in FIG. 3, the advance amount A decreases as the frequency deviates more from the peak value frequency Fpk. Accordingly, the damping effect is reduced. Thus, depending on the running state of the vehicle, a frequency deviation between the PT resonant frequency Fpt and the peak value frequency Fpk becomes larger according to a change of the PT resonant frequency Fpt, with the result that the damping effect may be reduced. If the frequencies deviate, the advance amount A more easily decreases in the case of second-order than in the case of first-order, but similarly decreases also in the case of the first-order.

In view of such a situation, the controller 12 executes a shift control as described below. In the following description, a speed ratio Ratio of the variator 20 is used as a speed ratio of the transmission 4. The speed ratio Ratio is a general term for the speed ratios of the variator 20 including an actual speed ratio Ratio_A, a target speed ratio Ratio_D and a destination speed ratio Ratio_T to be described later and includes at least any one of these. The same holds true for a primary pressure Ppri, which is a hydraulic pressure to be supplied to the pulley 21. The speed ratio of the transmission 4 may be a through speed ratio, which is an overall speed ratio of the variator 20 and the sub-transmission mechanism 30. Hereinafter, the transmission controller 12 is merely referred to as the controller 12.

Figure 4:
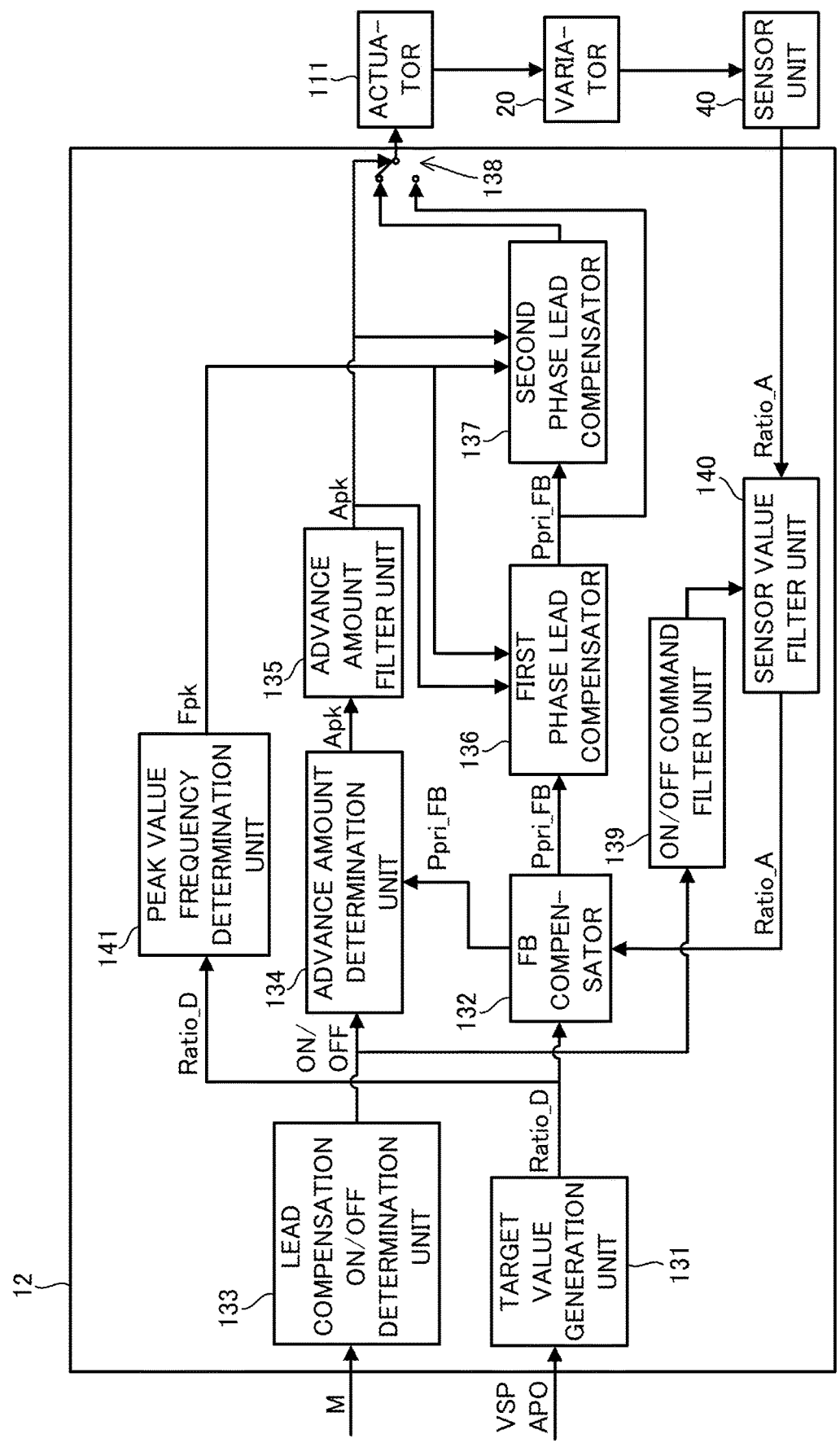
FIG. 4 is a diagram showing an example of a function block diagram of the transmission controller.

FIG. 4 is a diagram showing an example of a feedback function block diagram of the controller 12 showing essential parts of the shift control. The controller 12 includes a target value generation unit 131, an FB compensator 132, a lead compensation on/off determination unit 133, an advance amount determination unit 134, an advance amount filter unit 135, a first phase lead compensator 136, a second phase lead compensator 137, a switch unit 138, an off/off-command filter unit 139, a sensor value filter unit 140 and a peak value frequency determination unit 141. FB is an abbreviation of feedback.

The target value generation unit 131 generates a target value of the shift control. The target value is specifically the target speed ratio Ratio_D based on the destination speed ratio Ratio_T, which is a final target shift control value using the speed ratio Ratio as a shift control value. The shift control value may be, for example, the primary pressure Ppri serving as a control parameter.

The destination speed ratio Ratio_T is set in advance according to the running state of the vehicle in a shift map. Thus, the target value generation unit 131 reads a corresponding destination speed ratio Ratio_T from the shift map on the basis of the detected running state. The running state of the vehicle is specifically represented by the vehicle speed VSP and the accelerator pedal opening APO.

The target value generation unit 131 calculates the target speed ratio Ratio_D on the basis of the destination speed ratio Ratio_T. The target speed ratio Ratio_D is a transient target speed ratio until the destination speed ratio Ratio_T is reached and constitutes a target shift control value. The calculated target speed ratio Ratio_D is input to the FB compensator 132.

The FB compensator 132 calculates a feedback command value on the basis of the actual speed ratio Ratio_A, which is an actual value of the speed ratio Ratio, and the target speed ratio Ratio_D. The feedback command value is, for example, a feedback primary command pressure Ppri_FB for correcting an error between the actual speed ratio Ratio_A and the target speed ratio Ratio_D. The calculated feedback command value (feedback primary command pressure Ppri_FB) is input to the advance amount determination unit 134 and the first phase lead compensator 136.

The lead compensation on/off determination unit 133 determines to set on or off phase lead compensation of the feedback primary command pressure Ppri_FB. The lead compensation on/off determination unit 133 determines to set on or off the phase lead compensation according to pulley state values M. The pulley state values M are values for determining whether or not the pulleys 21, 22 are in a state where the front-rear vibration occurs, and include the rotation speed Npri, an input torque Tsec to the pulley 22, the speed ratio Ratio and a change rate a of the speed ratio Ratio.

The input torque Tsec can be calculated, for example, as a value obtained by multiplying the engine torque Te by a speed ratio set between the engine 1 and the pulley 22, thus, a gear ratio of the first gear train 3 and the speed ratio of the variator 20 in the present embodiment. The actual speed ratio Ratio_A and the target speed ratio Ratio_D can be applied as the speed ratio Ratio. The speed ratio Ratio may be the actual speed ratio Ratio_A or the target speed ratio Ratio_D.

The lead compensation on/off determination unit 133 specifically determines to set on or off the phase lead compensation of the feedback primary command pressure Ppri_FB according to all of four parameters including the rotation speed Npri, the input torque Tsec, the speed ratio Ratio and the change rate a. The lead compensation on/off determination unit 133 may be configured to determine to set on or off the phase lead compensation according to at least any one of the parameters out of the input torque Tsec, the speed ratio Ratio and the change rate a.

The lead compensation on/off determination unit 133 determines to set on or off the phase lead compensation of the feedback primary command pressure Ppri_FB according to an engaged state of the LU clutch 2a, a state of a driver operation to the transmission 4 and the presence or absence of a fail in addition to the pulley state values M.

Figure 5:
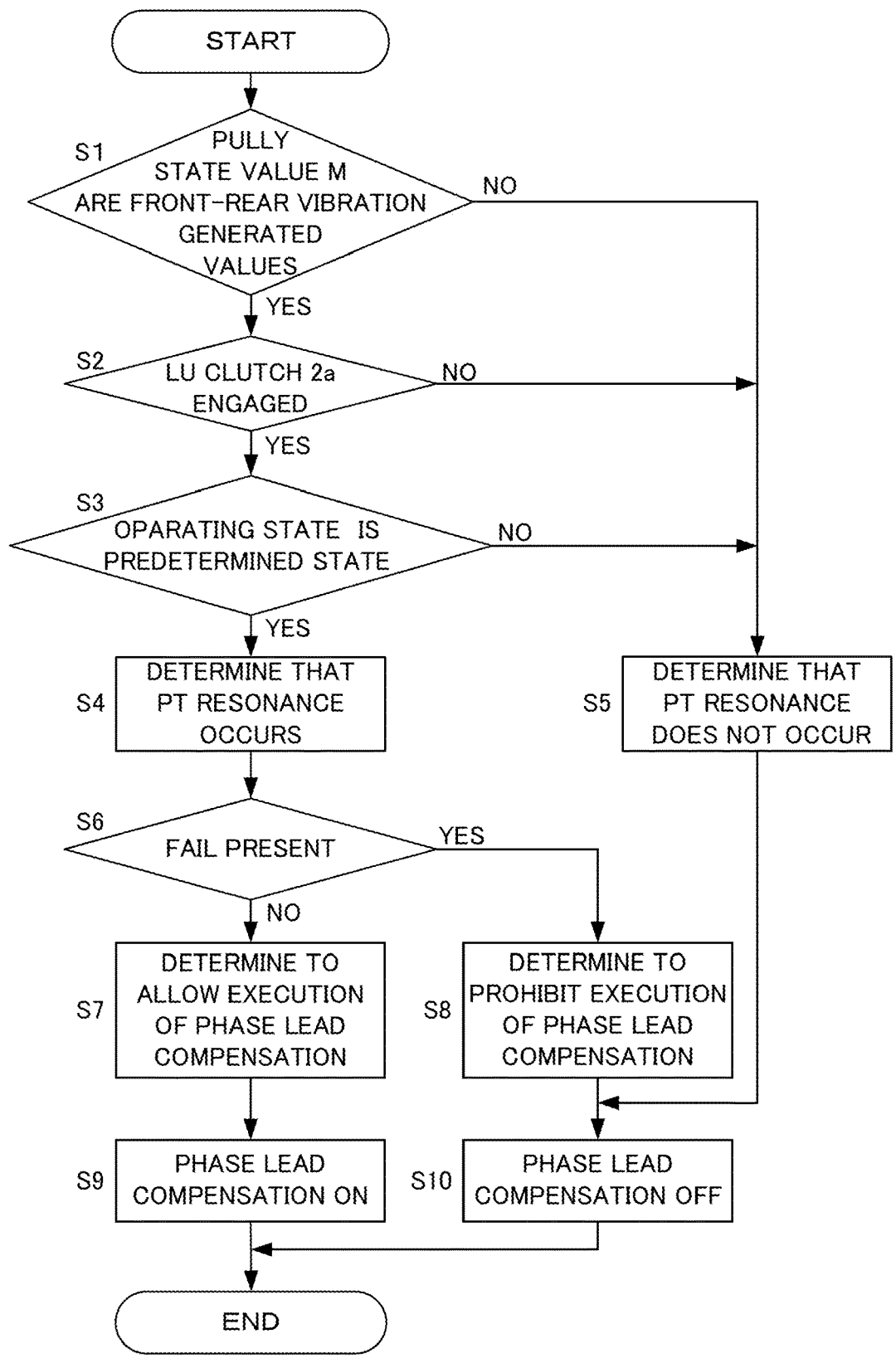
FIG. 5 is a flow chart showing an example of a control executed by the transmission controller.

FIG. 5 is a flow chart showing an example of a process performed by the controller 12. The process of this flow chart is specifically performed by the lead compensation on/off determination unit 133.

A process from Step S1 to Step S5 is a process for determining whether or not the power train PT resonates, in other words, a process for determining whether or not the front-rear vibration of the transmission 4 occurs. The resonance of the power train PT is referred to as PT resonance below.

In Step S1, the controller 12 determines whether or not the pulley state values M are values generated by the front-rear vibration. That is, whether or not the pulleys 21, 22 are in a state where the front-rear vibration occurs is determined in Step S1. In Step S1, the controller 12 makes the following determination for each of the rotation speed Npri, the input torque Tsec, the speed ratio Ratio and the change rate a of the speed ratio Ratio, which are the pulley state values M.

For the rotation speed Npri and the input torque Tsec, the controller 12 determines whether or not an operating point corresponding to the rotation speed Npri and the input torque Tsec is in a determination region specified according to these. The controller 12 determines that the rotation speed Npri and the input torque Tsec are front-rear vibration generated values if the operating point is in the determination region. A case where the operating point is in the determination region is, in other words, a case where the pulleys 21, 22 are vulnerable to disturbance, i.e. a case where the stability of the speed ratio Ratio lacks. The determination region can be set in advance by an experiment or the like.

For the speed ratio Ratio, the controller 12 determines that the speed ratio Ratio is the front-rear vibration generated value if the speed ratio Ratio is larger than a predetermined speed ratio Ratio 1, in other words, on a lower side than the predetermined speed ratio Ratio 1. The predetermined speed ratio Ratio 1 is a value for specifying a speed ratio at which the front-rear vibration occurs and, for example, 1. The predetermined speed ratio Ratio 1 can be set in advance by an experiment or the like.

For the change rate a, the controller 12 determines that the change rate a of the speed ratio Ratio is the front-rear vibration generated value if the change rate a is smaller than a predetermined value α1. The predetermined value α1 is a value for specifying the change rate a at which the front-rear vibration occurs and a case where the change rate a is smaller than the predetermined value α1 corresponds to a case where the speed ratio Ratio is in a steady state. The predetermined value α1 can be set in advance by an experiment or the like.

In Step S1, the controller 12 determines in the affirmative if all of these pulley state values M are determined to be the front-rear vibration generated values and determines in the negative if any one of these pulley state values M is determined not to be the front-rear vibration generated value.

In the case of negative determination in Step S1, the process proceeds to Step S5 and the controller 12 determines that the PT resonance does not occur. Thus, it is determined that the front-rear vibration does not occur. In this case, the process proceeds to Step S10 and the controller 12 sets off the phase lead compensation. After Step S10, the process of this flow chart is finished.

In the case of affirmative determination in Step S1, the process proceeds to Step S2 and the controller 12 determines whether or not the LU clutch 2a is engaged. In this way, whether or not to set the phase lead compensation is determined according to the engaged state of the LU clutch 2a.

If the determination is negative in Step S2, the LU clutch 2a is not engaged, wherefore it is determined that the front-rear vibration does not occur. In this case, the process proceeds to Step S5. If the determination is affirmative in Step S2, the LU clutch 2a is judged to be in a state where the front-rear vibration occurs. In this case, the process proceeds to Step S3.

In Step S3, the controller 12 determines whether or not the state of the driver operation to the transmission 4 is a predetermined state. The predetermined state includes at least either one of a first operating state where the speed ratio Ratio is larger than the predetermined speed ratio Ratio 1 and a second operating state where the speed ratio Ratio is in a steady state.

The first operating state is, for example, a state where the OD switch 49 is off. The second operating state is a state where the speed ratio Ratio is fixed by the driver operation such as a state where a manual range is selected by the select lever or a state where a manual mode such as a sport mode is selected.

By determining whether or not the state of the driver operation is the predetermined state, it can be determined that the speed ratio Ratio is continuously larger than the predetermined speed ratio Ratio 1 and that the speed ratio Ratio is continuously in the steady state. Thus, it can be more reliably determined that the speed ratio Ratio is in the state where the front-rear vibration occurs.

If the determination is negative in Step S3, the state of the driver operation is not the predetermined state, wherefore it is determined that the front-rear vibration does not occur. In this case, the process proceeds to Step S5. If the determination is affirmative in Step S3, the process proceeds to Step S4.

In Step S4, the controller 12 determines that the PT resonance occurs. Thus, it is determined that the front-rear vibration occurs. After Step S4, the process proceeds to Step S6.

In Steps S6 to S8, whether or not the phase lead compensation can be set on is determined. In other words, it is determined whether or not it is possible to perform the phase lead compensation.

In Step S6, the controller 12 determines the presence or absence of a fail. The fail can be any one of fails of the transmission 4 including fails of the hydraulic control circuit 11, sensors and switches used in the shift control of the transmission 4. The fail may be any one of fails of the vehicle including the fails of the transmission 4.

If the determination is affirmative in Step S6, the process proceeds to Step S8 and the controller 12 determines that the phase lead compensation should not be set on. That is, determination is given to prohibit the execution of the phase lead compensation. After Step S8, the process proceeds to Step S10.

If the determination is negative in Step S6, the process proceeds to Step S7 and the controller 12 determines that the phase lead compensation may be set on. That is, determination is given to allow the execution of the phase lead compensation. In this case, the process proceeds to Step S9 and the controller 12 sets on the phase lead compensation. After Step S9, the process of this flow chart is finished.

Referring back to FIG. 4, the lead compensation on/off determination unit 133 outputs an on-command when determining to set on the phase lead compensation, and outputs an off-command when determining to set off the phase lead compensation. The on/off-command is input to the advance amount determination unit 134 and the on/off-command filter unit 139 from the lead compensation on/off determination unit 133.

The advance amount determination unit 134 determines the advance amount Apk. The advance amount determination unit 134 is provided downstream of the lead compensation on/off determination unit 133. The advance amount determination unit 134 is provided in this way due to an arrangement in a signal path. The advance amount determination unit 134 determines the advance amount Apk according to the on/off-command, in other words, according to on/off determination of the phase lead compensation. The advance amount determination unit 134 determines the advance amount Apk to be zero if the off-command is input. The advance amount determination unit 134 determines the advance amount Apk to be a first advance amount Apk1 or a second advance amount Apk2 if the on-command is input.

The first advance amount Apk1 is set to correspond to a case where first-order phase lead compensation to be described later is performed, and the second advance amount Apk2 is set to correspond to a case where second-order phase lead compensation to be described later is performed. The second advance amount Apk2 is ½ of the first advance amount Apk1. The first advance amount Apk1 is, for example, 80 deg and can be a constant value. The first advance amount Apk1 can be set in advance by an experiment or the like. The advance amount Apk is input to the advance amount filter unit 135 from the advance amount determination unit 134.

The advance amount filter unit 135 is provided downstream of the advance amount determination unit 134 and performs a filtering process of the advance amount Apk. The advance amount filter unit 135 is provided in this way due to the arrangement in the signal path. The advance amount filter unit 135 is specifically a low pass filter unit and constituted, for example, by a first-order low pass filter.

The advance amount filter unit 135 constitutes a gain smoothing unit configured to smooth a change of a gain G of the phase lead compensation corresponding to the on/off determination of the phase lead compensation when the lead compensation is on/off-switched by performing the filtering process of the advance amount Apk. By smoothing the change of the gain G, a change amount of the gain G associated with the on/off switch of the phase lead compensation is suppressed.

The advance amount Apk is input to the first phase lead compensator 136, the second phase lead compensator 137 and the switch unit 138 from the advance amount filter unit 135. The peak value frequency Fpk is also input to the first and second phase lead compensators 136, 137 from the peak value frequency determination unit 141.

The both first and second phase lead compensators 136, 137 perform the first-order phase lead compensation of the feedback primary command pressure Ppri_FB on the basis of the input advance amount Apk and further the input peak value frequency Fpk. By performing the phase lead compensation of the feedback primary command pressure Ppri_FB, the phase lead compensation of the feedback shift control of the transmission 4 is performed. The first and second phase lead compensators 136, 137 are specifically constituted by first-order low pass filters and perform the first-order phase lead compensation of the feedback primary command pressure Ppri_FB by performing the filtering process corresponding to the input advance amount Apk and, further, the input peak value frequency Fpk.

The second phase lead compensator 137 is provided in series with the first phase lead compensator 136. The second phase lead compensator 137 is provided in this way due to the arrangement in the signal path. The feedback primary command pressure Ppri_FB having the first-order phase lead compensation performed thereon by the first phase lead compensator 136 is input to the second phase lead compensator 137.

Accordingly, the second phase lead compensator 137 further performs the first-order phase lead compensation in the case of performing the first-order phase lead compensation of the feedback primary command pressure Ppri_FB. In this way, the second-order phase lead compensation of the feedback primary command pressure Ppri_FB is performed. The second phase lead compensator 137 constitutes a lead compensation unit together with the first phase lead compensator 136.

The switch unit 138 switches, according to the input advance amount Apk, between a case where the phase lead compensation is performed by the first and second phase lead compensators 136, 137, i.e. a case where the second-order phase lead compensation is performed, and a case where the phase lead compensation is performed only by the first phase lead compensator 136, i.e. a case where the first-order phase lead compensation is performed for the following reasons.

By performing the second-order phase lead compensation, it is possible to suppress an increase of the gain G and suppress the instability of the shift control as compared to the case where the first-order phase lead compensation is performed. Further, if the advance amount A of the first-order phase lead compensation corresponding to the feedback primary command pressure Ppri_FB is smaller than a predetermined value A1, a gain suppressing effect cannot be expected, whereas a situation where the gain G decreases due to a frequency deviation and the damping effect is easily reduced can be avoided by performing the first-order phase lead compensation. The predetermined value A1 can be preferably set at a minimum value within a range where the gain suppressing effect by the second-order phase lead compensation is obtained.

In performing the phase lead compensation in this way, the advance amount determination unit 134 and the switch unit 138 are specifically configured as follows.

Specifically, the advance amount determination unit 134 calculates the advance amount A of the first-order phase lead compensation of the feedback primary command pressure Ppri_FB on the basis of the input feedback primary command pressure Ppri_FB. The advance amount determination unit 134 judges to perform the first-order phase lead compensation if the advance amount A is smaller than the predetermined value A1, and determines the advance amount Apk as the first advance amount Apk1. Further, the advance amount determination unit 134 judges to perform the second-order phase lead compensation if the advance amount A is equal to or larger than the predetermined value A1, and determines the advance amount Apk as the second advance amount Apk2. The advance amount A can be set in advance using map data or the like.

The switch unit 138 switches to perform the phase lead compensation only by the first phase lead compensator 136 if the first advance amount Apk1 is input. Further, the switch unit 138 switches to perform the phase lead compensation by the first and second phase lead compensators 136, 137 if the second advance amount Apk2 is input.

By this configuration, the first and second phase lead compensators 136, 137 are configured to perform the phase lead compensation only by the first phase lead compensator 136 according to the advance amount A. Further, the first and second phase lead compensators 136, 137 are configured to perform the phase lead compensation only by the first phase lead compensators 136 if the advance amount A is smaller than the predetermined value A1.

The switch unit 138 may be configured to perform the phase lead compensation only by the second phase lead compensator 137 in the case of performing the first-order phase lead compensation. The advance amount determination unit 134 may input the advance amount A to the switch unit 138 instead of the advance amount Apk and the switch unit 138 may switch on the basis of the thus input advance amount A. In this way, the first-order and second-order phase lead compensations can be properly performed even if smoothing is applied to the first and second advance amounts Apk1 and Apk2.

The switch unit 138 constitutes, together with the lead compensation on/off determination unit 133, a setting unit configured to set the feedback primary command pressure Ppri_FB having the lead compensation performed thereon by at least either one of the first and second phase lead compensators 136, 137 as the feedback primary command pressure Ppri_FB according to the pulley state values M. At least either one of the first and second phase lead compensators 136, 137 constitutes the lead compensation unit configured to perform the lead compensation of the feedback primary command pressure Ppri_FB. The feedback primary command pressure Ppri_FB having the lead compensation performed thereon constitutes a feedback primary command pressure value after the compensation.

An unillustrated primary command pressure Ppri_FF set on the basis of the feedback primary command pressure Ppri_FB selected from the switch unit 138 and the target speed ratio Ratio_D (target primary command pressure for determining a balance thrust and the speed ratio) is input to an actuator 111. The actuator 111 is, for example, a primary pressure control valve provided in the hydraulic control circuit 11 to control the primary pressure Ppri and controls the primary pressure Ppri so that an actual pressure Ppri_A of the primary pressure Ppri reaches a command pressure Ppri_D corresponding to the target speed ratio Ratio_D. In this way, the speed ratio Ratio is controlled so that the actual speed ratio Ratio_A reaches the target speed ratio Ratio_D.

A sensor unit 40 detects the actual speed ratio Ratio_A of the variator 20. The sensor unit 40 is specifically constituted by the rotation speed sensors 42 and 43. The actual speed ratio Ratio_A, which is an actual value (sensor value) of the speed ratio detected by the sensor unit 40, is input to the sensor value filter unit 140. The on/off-command is also input to the sensor value filter unit 140 via the on/off-command filter unit 139. The on/off-command filter unit 139 may be omitted.

The sensor value filter unit 140 performs a filtering process of the actual speed ratio Ratio_A. In the sensor value filter unit 140, a mode of the filtering process is changed according to the on/off-command. Specifically, an order of the filtering process is switched or the execution/stop of the filtering process is switched according to the on/off-command in the sensor value filter unit 140. The sensor value filter unit 140 is switched to a first-order low pass filter if the off-command is input, and switched to a higher-order low pass filter or stops the filtering process if the on-command is input.

By configuring the sensor value filter unit 140 in this way, a slight delay occurs in a region equal to or lower than a frequency desired to be removed if the first-order low pass filter is used, whereas a delay is improved if the on-command is input. As a result, the phase of the feedback primary command pressure Ppri_FB can be further advanced. The sensor value filter unit 140 can include, for example, one or more first-order low pass filters provided to be able to switch the execution/stop or the order of the filtering process. The actual speed ratio Ratio_A is input to the FB compensator 132 from the sensor value filter unit 140.

The peak value frequency determination unit 141 determines the peak value frequency Fpk of the phase lead compensation. The peak value frequency determination unit 141 changes the peak value frequency Fpk by determining the peak value frequency Fpk according to the speed ratio Ratio. The speed ratio Ratio is specifically the target speed ratio Ratio_D. Thus, the target speed ratio Ratio_D is input to the peak value frequency determination unit 141 from the target value generation unit 131.

The peak value frequency Fpk determined by the peak value frequency determination unit 141 is input to each of the first and second phase lead compensators 136, 137. In this way, the peak value frequency determination unit 141 is configured to set the peak value frequency Fpk of each of the phase lead compensations performed by the first and second phase lead compensators 136, 137 on the basis of the speed ratio Ratio. The peak value frequency determination unit 141 specifically changes the peak value frequency Fpk according to the speed ratio Ratio as described next.

Figure 6:
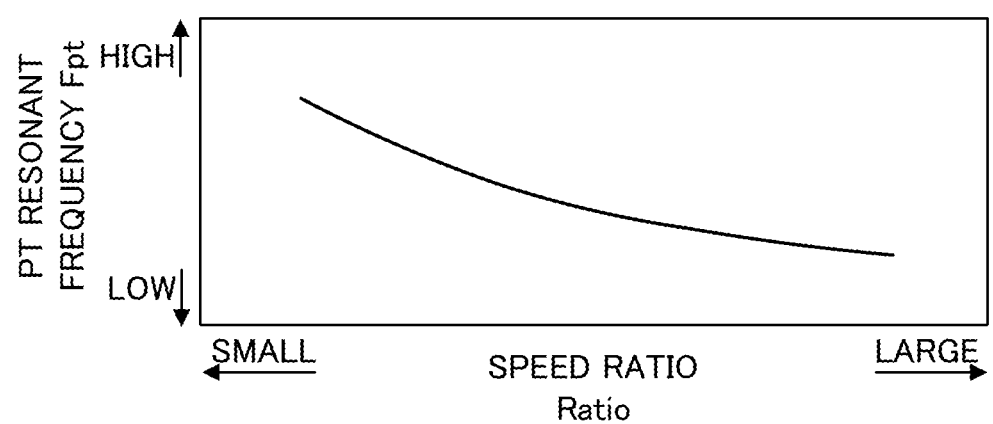
FIG. 6 is a graph showing a change of a resonant frequency corresponding to a speed ratio.

FIG. 6 is a graph showing a change of the PT resonant frequency Fpt corresponding to the speed ratio Ratio. As shown in FIG. 6, the PT resonant frequency Fpt decreases with an increase in the speed ratio Ratio. Thus, the peak value frequency determination unit 141 reduces the peak value frequency Fpk with an increase in the speed ratio Ratio. This can properly suppress a frequency deviation between the PT resonant frequency Fpt and the peak value frequency Fpk even if the PT resonant frequency Fpt changes according to the speed ratio Ratio.

Next, main functions and effects of the controller 12 are described.

The controller 12 constitutes a control device for continuously variable transmission for executing a feedback shift control of the transmission 4 so that the actual speed ratio Ratio_A reaches the target speed ratio Ratio_D. The controller 12 includes the first and second phase lead compensators 136, 137 configured to perform the phase lead compensation of the feedback primary command pressure Ppri_FB and the peak value frequency determination unit 141 configured to change the peak value frequency Fpk according to the speed ratio Ratio.

According to the controller 12 thus configured, even if the speed ratio Ratio changes to change the PT resonant frequency Fpt, the frequency deviation between the PT resonant frequency Fpt and the peak value frequency Fpk can be suppressed by changing the peak value frequency Fpk according to the speed ratio Ratio. Thus, it can be improved that the damping effect by the phase lead compensation is reduced according to a change of the PT resonant frequency Fpt.

In the controller 12, the peak value frequency determination unit 141 reduces the peak value frequency Fpk with an increase in the speed ratio Ratio. According to the controller 12 thus configured, the frequency deviation can be properly suppressed.

In the controller 12, the peak value frequency determination unit 141 is configured to set the peak value frequency Fpk of each of the phase lead compensations performed by the first and second phase lead compensators 136, 137 on the basis of the speed ratio Ratio.

According to the controller 12 thus configured, a frequency deviation can be suppressed also in the case of performing the second-order phase lead compensation using each of the first phase lead compensator 136 and the second phase lead compensator 137 for performing the first-order phase lead compensation.

In the controller 12, the peak value frequency determination unit 141 determines the peak value frequency Fpk on the basis of the target speed ratio Ratio_D. According to the controller 12 thus configured, the peak value frequency Fpk can be stabilized even if the actual speed ratio Ratio_A varies.

Although the embodiment of the present invention has been described above, the above embodiment is merely an illustration of one application example of the present invention and not intended to limit the technical scope of the present invention to the specific configuration of the above embodiment.

In the above embodiment, a case has been described where the first and second phase lead compensators 136, 137 constitute the lead compensation unit. However, a first-order phase lead compensator may be constituted by a single phase lead compensator such as the first phase lead compensator 136 or the second phase lead compensator 137.

Further, although the peak value frequency determination unit 141 determines the peak value frequency Fpk according to the target speed ratio Ratio_D in the above embodiment, the peak value frequency Fpk may be determined according to the actual speed ratio Ratio_A. With this arrangement, even if the target speed ratio Ratio_D and the actual speed ratio Ratio_A deviate, the peak value frequency Fpk can be approximated more to a targeted frequency.

Further, in the above embodiment, a case has been described where the FB compensator for executing the feedback control on the basis of the target speed ratio Ratio_D and the actual speed ratio Ratio_A, i.e. a so-called servo-type feedback control is used. However, a FB compensator for executing not only a servo-type feedback control but also, for example, a feedback control according to a variation of an input torque may be used.

In the above embodiment, a case has been described where the controller 12 is constituted as the control device for continuously variable transmission. However, the control device for continuously variable transmission may be, for example, realized by a plurality of controllers.

The present application claims a priority based on Japanese Patent Application No. 2016-53389 filed with the Japan Patent Office on Mar. 17, 2016, all the contents of which are hereby incorporated by reference.

The invention claimed is:

1. A control device for a continuously variable transmission, comprising
a controller configured to:
execute a feedback shift control of the continuously variable transmission on a basis of an actual value representing a state of the continuously variable transmission;
perform a lead compensation of the feedback shift control when a state where a front-rear vibration occurs is determined by determining a presence or absence of the state where the front-rear vibration occurs; and
change a peak value frequency of the lead compensation according to a speed ratio of the continuously variable transmission.

2. The control device for the continuously variable transmission according to claim 1, wherein
the controller is configured to reduce the peak value frequency with an increase in the speed ratio.

3. The control device for the continuously variable transmission according to claim 1, wherein
the controller is further configured to:
perform a first-order lead compensation of the feedback shift control as a first lead compensation;
perform a second lead compensation in series with a performing of the first lead compensation in a signal path and perform the first-order lead compensation of the feedback shift control having the lead compensation performed thereon as the first lead compensation unit; and
set the peak value frequency of each of the lead compensations performed as the first lead compensation and the second lead compensation on a basis of the speed ratio.

4. The control device for the continuously variable transmission according to claim 1, wherein
the speed ratio is a target speed ratio set on the basis of a vehicle speed and an accelerator pedal opening.

5. The control device for the continuously variable transmission according to claim 1, wherein
the speed ratio is a detected actual speed ratio.

6. A control method for a continuously variable transmission, comprising:
executing a feedback shift control of the continuously variable transmission on a basis of an actual value representing a state of the continuously variable transmission;
performing a lead compensation of the feedback shift control when a state where a front-rear vibration occurs is determined by determining a presence or absence of the state where the front-rear vibration occurs; and
changing a peak value frequency of the lead compensation according to a speed ratio of the continuously variable transmission.

7. A control device for a continuously variable transmission, comprising:
feedback control means for executing a feedback shift control of the continuously variable transmission on a basis of an actual value representing a state of the continuously variable transmission;
lead compensation means for performing a lead compensation of the feedback shift control when a state where a front-rear vibration occurs is determined by determining a presence or absence of the state where the front-rear vibration occurs; and
peak value frequency determination means for changing a peak value frequency of the lead compensation according to a speed ratio of the continuously variable transmission.

* * * * *